A. J. MACY.
STABILIZER.
APPLICATION FILED JULY 28, 1913.

1,203,221.

Patented Oct. 31, 1916.
5 SHEETS—SHEET 2.

A. J. MACY.
STABILIZER.
APPLICATION FILED JULY 28, 1913.

1,203,221.

Patented Oct. 31, 1916.
5 SHEETS—SHEET 4.

Witnesses
J. W. Angell
Charles W. Hills Jr.

Inventor
Alfred J. Macy
by Charles W. Hills
Atty.

UNITED STATES PATENT OFFICE.

ALFRED J. MACY, OF CHICAGO, ILLINOIS.

STABILIZER.

1,203,221.     Specification of Letters Patent.     Patented Oct. 31, 1916.

Application filed July 28, 1913. Serial No. 781,506.

*To all whom it may concern:*

Be it known that I, ALFRED J. MACY, a citizen of the United States, and a resident of the city of Chicago, in the county of Cook and State of Illinois, have invented certain new and useful Improvements in Stabilizers; and I do hereby declare that the following is a full, clear, and exact description of the same, reference being had to the accompanying drawings, and to the numerals of reference marked thereon, which form a part of this specification.

The manipulation of the controls of a heavier than air flying machine by an aviator during a flight necessitates a knowledge and skill of flying as well as a perfect familiarity with the various levers, whereby the various operations performed become more or less instinctive. The slightest mistake or misjudgment on the part of the operator is likely to entirely unbalance the machine allowing the same to fall to earth.

This invention relates to mechanism adapted to relieve the operator of attention to practically all the controls on an aeroplane, said mechanism acting automatically to counteract all tendencies of the machine to deviate from its course or overturn, such as unforeseen gusts of wind, holes in the air, and other phenomena peculiar to the atmosphere.

It is an object of this invention to provide a device adapted to automatically operate the governing means for the controlling mechanism of an aeroplane, to maintain the machine in a predetermined path or flight, regardless of fluctuations therefrom, other than those under the direct control of an operator.

It is also an object of this invention to provide a vibratory stabilizing mechanism adapted to oscillate from one position to another immediately correcting the slightest fluctuation of a machine from its predetermined course or position in the air.

It is also an object of this invention to provide a stabilizing mechanism adapted to be attached to a vehicle, such mechanism, when moved from normal, acting to set in operation positively driven means for operating the controls of a vehicle to restore the vehicle and stabilizing mechanism to normal.

It is also an object of this invention to provide a container having a plurality of electrical contacts therein, and a freely supported and freely movable element therein closely adjacent said electrical contacts so that the slightest vibration or movement transmitted thereto will cause the same to close the contacts to set in operation means for correcting such a movement by suitably manipulating the controls of the machine, thereby properly positioning the machine in the air.

It is also an object of this invention to provide a container suitably mounted to permit adjustment thereof at various angles, and with means within said container for closing electrical contacts, to set in operation mechanism for maintaining the container in a predetermined position.

It is also an object of this invention to provide a stabilizing element adapted to be adjusted to various angles to maintain a machine to which it is attached in a predetermined course, and with means associated with said stabilizing element to properly indicate the adjustment thereof to an operator.

It is also an object of this invention to provide a container having a movable element therein adapted to be supported against one or more electrical contacts, said movable element adapted to continuously move from one electrical contact to another in response to the slightest deviation of a machine to which the device is attached from its predetermined course, thus immediately sensing and correcting any deviation of the machine from its course.

It is also an object of this invention to provide a stabilizing element adapted to close one or a plurality of electrical contacts to set controlling mechanism in operation, said stabilizing mechanism so connected to the controlling levers of a vehicle as to automatically disconnect said stabilizing means from said controlling levers when said levers are manually actuated, and to be automatically thrown into operation when said levers are released.

It is furthermore an object of this invention to provide a freely movable, vertically pivoted element adapted to close various electrical contacts with the slightest vibration transmitted thereto, such as a momentary tilting of a vehicle to which it is attached, thereby setting controlling mechanisms for said vehicle in operation to restore the same to its proper path of movement.

It is finally an object of this invention to provide a simple device consisting of few parts and easy of assembly, and of extremely sensitive nature acting immediately to correct all fluctuations of a vehicle to which it is attached from normal.

The invention (in a preferred form) is hereinafter more fully described, and defined in the accompanying drawings and specification.

Figures 1, 17, 18, 19:
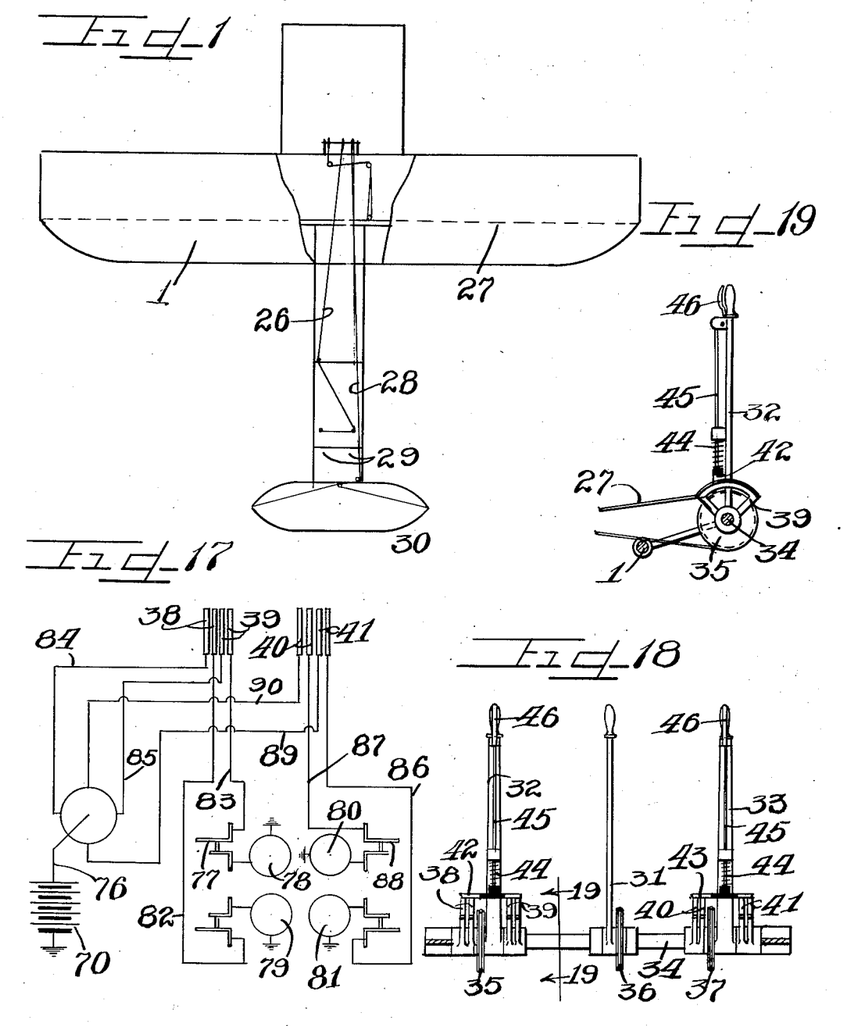
Figure 1 is a diagrammatic top plan view, partly broken away, and with parts omitted, of a Wright type of aeroplane illustrating the usual controlling cables thereon.
Fig. 17 is a diagrammatic view illustrating the scheme of electrical connections.
Fig. 18 is a rear elevation of the controlling levers of an aeroplane.
Fig. 19 is a section taken on line 19—19 of Fig. 18.

As shown in the drawings: The reference numeral 1, indicates as a whole a Wright machine.

Figures 4, 5, 6, 7, 8:
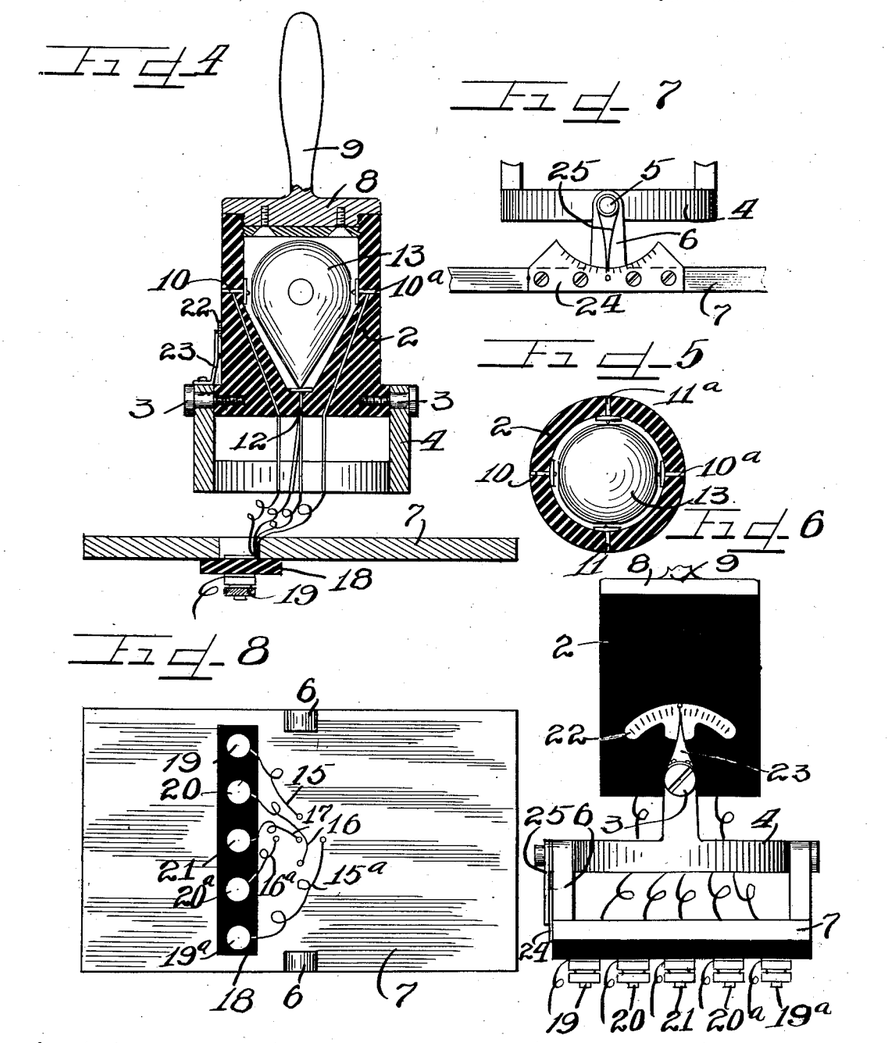
Fig. 4 is a central section taken through the adjustable stabilizing element, and showing the movable element therein in elevation.
Fig. 5 is a central, horizontal section taken through said stabilizing element, with the movable element in elevation.
Fig. 6 is a fragmentary, exterior view of the stabilizing element, showing the indicating means mounted concentrically about a longitudinal horizontal axis thereof.
Fig. 7 is a fragmentary elevation of a portion of the mounting for said stabilizing element, illustrating the indicating means for denoting the inclination of said element about the transverse horizontal axis thereof.
Fig. 8 is a top plan view of the base upon which said stabilizing element is mounted, and illustrating the flexible electrical connections projecting therefrom.
Figures 9, 12:
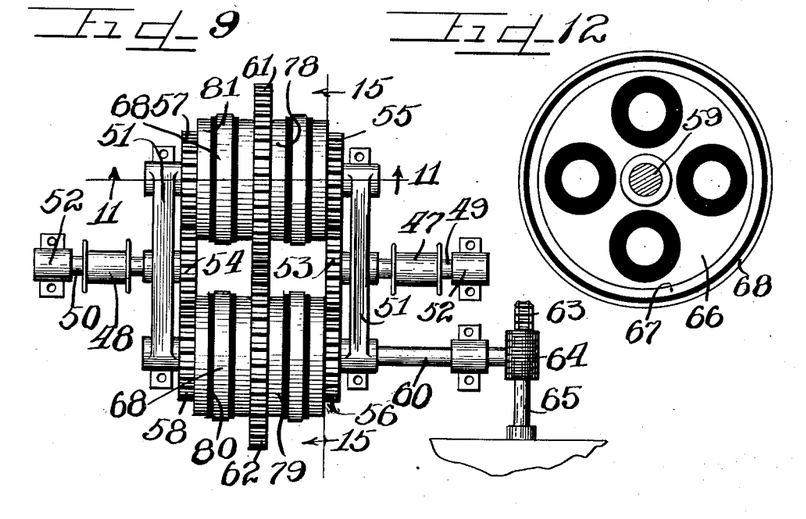
Fig. 9 is a top plan view of the magnetic clutch driven drums, which serve to operate the controlling cables of the machine.
Fig. 12 is an end elevation of one of the members of the clutch members, showing the electro-magnets mounted thereon.
Figure 10:
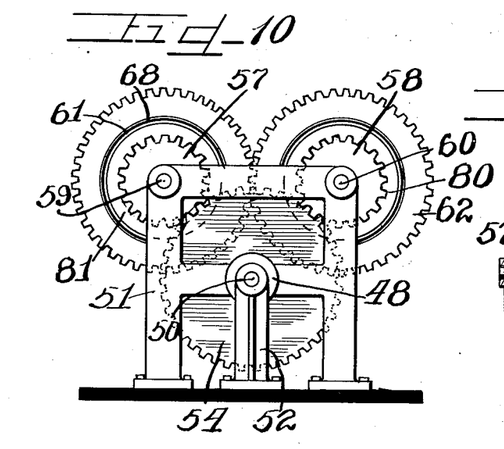
Fig. 10 is an end elevation thereof.
Figure 11:
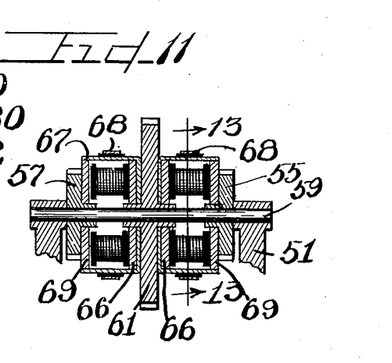
Fig. 11 is a section taken on line 11—11 of Fig. 9.

As shown in Figs. 4, 5, and 6, the reference numeral 2, indicates a stabilizing bowl constructed of insulating material and having supporting studs 3, threaded therein, and journaled in a bracket 4, which is also journaled on gudgeons 5, at right angles to said studs 3, in upstanding brackets 6, formed on a supporting plate 7. A cover 8, insulated on its inner face and provided with an actuating handle 9, is threaded into the upper open end of said bowl 2. A pair of longitudinal electrical contacts 10, and 10$^a$, respectively, extend inwardly through the walls of said bowl, and at right angles thereto, and disposed substantially in the same plane therewith, are lateral oppositely disposed electrical contacts 11, and 11$^a$, respectively. A central contact 12, extends upwardly through the bottom of said bowl, and resting continually thereupon is a pointed pear shaped element 13, which is flattened on its periphery at points corresponding with the position of said electrical contacts such that electrical communication may be effected between said central contact 12, and either one or both of said contacts 10, and 11, or either of the other of said pairs of electrical contacts. Wires 15, 15$^a$, 16, 16$^a$, and 17, are connected to the respective contact members 10, 10$^a$, 11, and 11$^a$, and 12, or 12$^a$, respectively, and are then led downwardly through a recess in said base 7, to a terminal block, 18, and are there respectively connected to the terminals 19, 19$^a$, 20, 20$^a$, and 21, respectively. Secured on the outer surface of said stabilizing bowl, and concentric with one of said stud pintles 3, is a graduated scale 22, and rigidly secured in upright position on said bracket 4, is a pointer 23, which, as said bowl is inclined about said horizontal axis 3, will designate the amount of inclination thereof. Likewise an indicating scale 24, is rigidly secured on said base 7, concentric with one of said studs 5, and a pointer 25, is secured on, and is adapted to move with said stud pin 5, to traverse said scale 24, and designate the inclination of said bowl about said respective horizontal axis.

Figure 2:
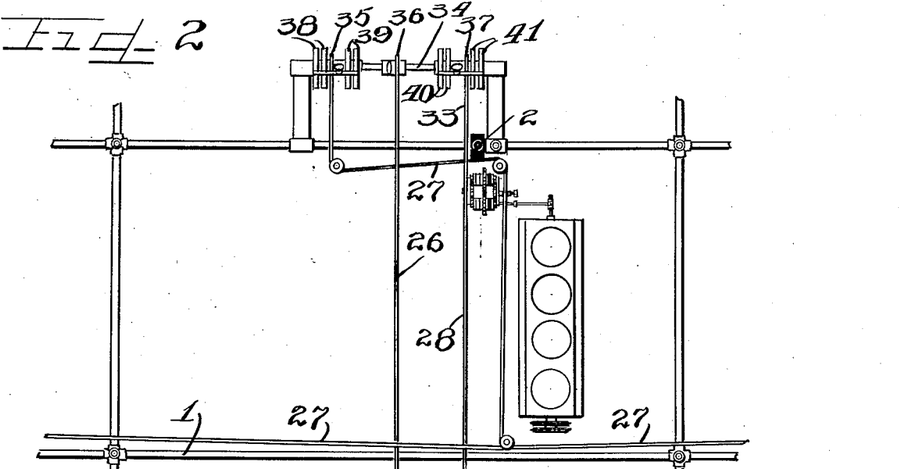
Fig. 2 is an enlarged fragmentary top plan view showing the power plant and controlling levers, and with the automatic, positively driven, power operating actuating mechanism for such controlling means shown associated therewith.
Figures 3, 22:
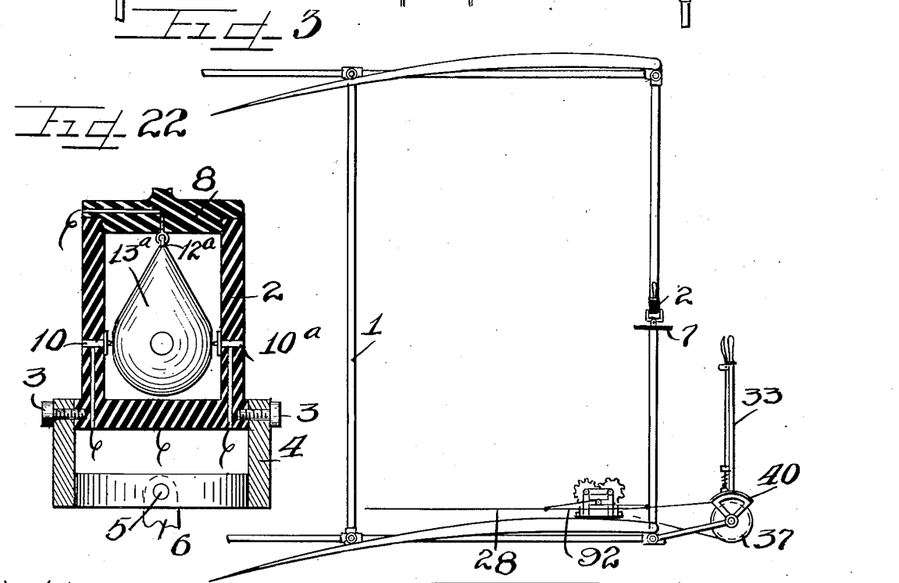
Fig. 3 is a diagrammatic side elevation with parts omitted, showing the position of the stabilizing mechanism with respect to the controlling levers of the device.
Fig. 22 is a modification of the stabilizing element.

As shown in Figs. 1, 2, and 3, controlling cables 26, 27, and 28, are connected respectively on the machine, the cable 26, to the vertical guiding rudders of the machine for the purpose of diverting the same laterally through the air, the cable 27, to the warping surfaces or ailerons, at the tips of the main planes, and the cable 28, to the rear elevating surfaces 30, of the aeroplane. Mechanism is provided for manually actuating said cables to control the aeroplane, and this comprises the levers 31, 32, and 33, which are respectively connected to said cables 26, 27, and 28, and are pivotally mounted upon a transverse shaft 34, situated conveniently to the operator and as shown in drawings slightly in advance of the main frame of the aeroplane, substantially in line with the lower struts thereof. A sheave 35, is rigidly connected upon said lever 32, to move therewith at all times, said cord or cable 27, being wound thereabout. Levers 31, and 33, are likewise provided with sheaves 36, and 37, respectively, the cable 26, being wound about said sheave 36, as already described with reference to the lever 32. Thus it is apparent that the outer levers 32, and 33, control respectively the lateral and longitudinal inclining mechanisms of the aeroplane, whereas said lever 31, serves to guide said aeroplane, laterally in its flight through the air. Two pairs of arc shaped insulated contact members 38, and 39, respectively are secured upon said shaft 34, adjacent said lever 32, and likewise two pairs of similar contact members 40, and 41, respectively, are secured on said shaft 34, adjacent said lever 33. A contact bridge member 42, is slidably mounted upon said lever 32, and a similar contact bridge member 43, is likewise mounted upon said lever 33, and in each case said bridge members are impelled downwardly normally into contact with the respective arc shaped contact members by spiral springs 44. A pull rod 45, is connected to said bridge members and extends upwardly along each of the respective levers 32, and 33, and may be actuated by a grip 46, to raise said bridge members against the pressure of said spiral springs, to disconnect said contact members from one another. Of course, said bridge member is divided into two parts, each of which is insulated from one another, the one portion adapted to engage one pair of said contact members, and the other to engage the other of said contact members, as, for instance, members 38, and 39, respectively.

The power driven means for actuating the controlling cables 27, and 28, of the aeroplane, consist of the drums 47, and 48, respectively, which are suitably keyed on shafts 49, and 50, journaled in a frame 51, and supported at their outer ends by bearings 52. Secured upon the inner end of each of said drum shafts are gears 53, and 54, respectively each of which meshes with a pair of gears at all times, the pair meshing with the gear 53, being denoted by the reference numerals 55, and 56, and those meshing with the gear 54, being denoted by the reference numerals 57, and 58, respectively. Thus each of said drum shafts 49, and 50, may be independently driven from either one of the respective pairs of gears meshing therewith. For the purpose of driving each one of said pairs of gears independently of one another, a plurality of magnetic clutches are provided, one pair being mounted upon a shaft 59, which also supports said gears 55, and 57, slidably and rotatably thereon, and the other pair of said magnetic clutches, mounted upon a shaft 60, which also freely supports said gears 56, and 58, respectively. Rigidly secured upon each of said shafts 59, and 60, and intermeshing with one another are centrally disposed gears 61, and 62, said shaft 60, being extended at one end and provided with a worm wheel 63, driven by a worm 64, secured upon the crank shaft 65, of the motor of the aeroplane, said shaft 60, thereby serving through the intermediation of said gears 61, and 62, to also drive said shaft 59, at all times. The magnetic clutch elements comprise disks 66, each of which is rigidly secured to each of said central gears 61, and 62, and secured between said disks and said gears is a cup member 67, which projects outwardly from said disk, and has mounted and insulated therefrom on the outer periphery thereof, a contact ring 68. A number of electromagnets are rigidly mounted upon each of said disks 66, and project outwardly therefrom surrounded by said cup member, and magnetic disks 69, adapted to be attracted and held immovably by said electromagnets, are rigidly secured to each of said gears 55, and 56, 57, and 58, respectively to move therewith at all times. Thus it is apparent that when said electro-magnets are energized said magnetic disks 69, mounted on the respective gears and slidable therewith will be drawn inwardly upon the shaft and the attraction of the magnets of the clutch will constrain said respective driving gears to move therewith, thus driving either one or both of the gears 53, 54, in one direction or the other, as the case may be. Any suitable source of E. M. F. such as storage battery 70, may be used for energizing the electro-magnets of said clutches.

Of course, in preserving the equilibrium of the aeroplane it is desirable that the respective magnetic clutches operating the various controlling cables of said aeroplane be actuated at the proper time to counteract any effect which would serve to deviate the aeroplane from its course. For this purpose the respective terminals 19, 19ª, 20, 20ª, and 21, respectively, on said terminal block 18, are connected to the source of E. M. F. and with said contact members 38, 39, 40, and 41, respectively, and thence with said magnetic clutches already described. One terminal of each of said magnetic clutch members is grounded, as is likewise one terminal of the source of E. M. F. In each of said respective clutch members the electro-magnets are connected in multiple and one end of the windings thereof being grounded, the other is led to the contact ring 68, on the outer periphery of the clutch members.

Figure 16:
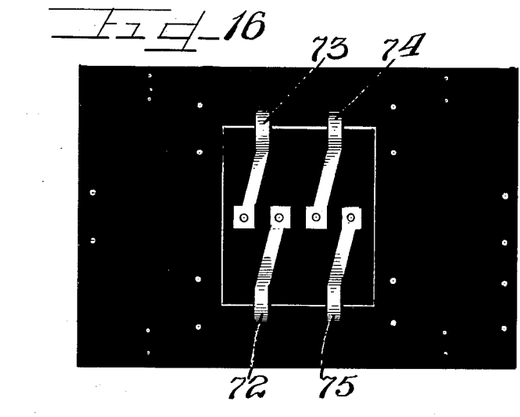
Fig. 16 is a top plan view of the insulating base for said magnetic clutch members, showing the contact brushes mounted thereon.

Mounted on the support for said frame 51, is a base 71, which has insulatably secured thereon the respective contact brushes 72, 73, 74, and 75, which bear respectively upon the contact rings 68, on each one of said clutch members. The electrical connections are shown more clearly in Fig. 17, in which a conductor 76, leads from the source of E. M. F. 70, to the terminal 21, and thence to the central contact 12, within said stabilizing bowl. Each of said clutches is connected by means of a suitable wire with one of a pair of said arc shaped contact members mounted adjacent the controlling levers of the aeroplane, and in each case normally closed spring switches 77 and 78, are interposed in the line of each of said conductors.

The clutches for the lateral controls are designated by the reference numerals 78, and 79, whereas the clutches for the longitudinal controls are designated by the reference numerals 80, and 81, respectively. The wires 83 and 82 from said clutches 78, and 79, lead respectively through said spring switches 77, to one each of the respective pair of arc shaped contact members 38, and 39, and, connected to each of the other of the contact members of said pairs, are conductors 84, and 85, which lead to the respective terminals 19, and 19ª, in said terminal block, 18, and thence to the contact members 10, and 10ª, respectively in said stabilizing bowl. In a similar manner conductors 86, and 87, lead from said clutch members 80, and 81, through spring switches 88, and are connected at their ends to one each of the pairs of arc shaped contact members 40 and 41, respectively. Likewise, conductors 89, and 90, respectively, connected to said terminal block and to the contact members 11, and 11ª, lead to one each of the pairs of arc shaped contact members 40, and 41, thus permitting an electrical circuit to be established between the respective conductors 86, and 87, and 89, and 90, by means of said bridge contact member 43. Said bridge contact member 42, acts in a similar manner to effect electrical communication between said conductors 82, and 84, and 83, and 85. The purpose of the respective bridge members 42, and 43, is to permit the electric circuits to be completely broken from either the transverse or longitudinal controlling mechanism of the aeroplane when said levers 32, or 33, are manually actuated, so that the stabilizing device will have no tendency to counteract manipulations of the controlling mechanism effected by an operator.

Figures 13, 21:
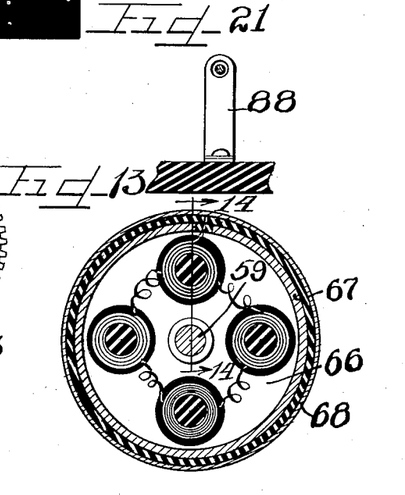
Fig. 13 is a section taken on line 13—13 of Fig. 11.
Fig. 21 is a section taken on line 21—21 of Fig. 20.
Figure 14:
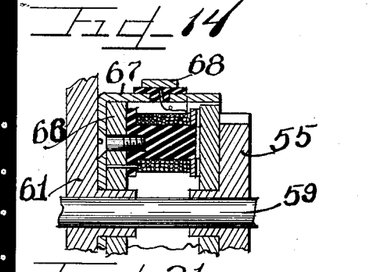
Fig. 14 is a fragmentary section taken on line 14—14 of Fig. 13.
Figure 15:
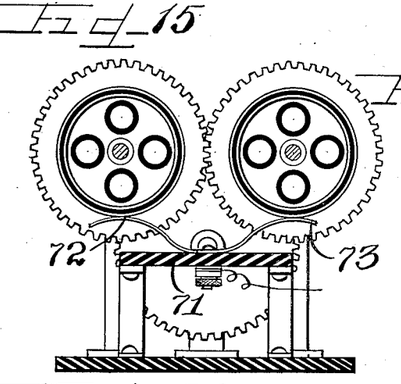
Fig. 15 is a section taken on line 15—15 of Fig. 9.
Figure 20:
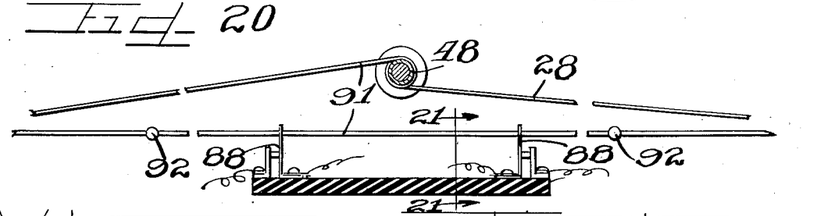
Fig. 20 is a section taken through the insulating base for the magnetic clutch mechanism with parts omitted to illustrate one of the auxiliary cables connected to one of the main controlling cables of the aeroplane for automatically switching the current from the magnetic clutches when the main cable has been adjusted to extreme position.

For the purpose of disconnecting the clutches when the adjusting mechanism of the aeroplane has been moved into an extreme position, an auxiliary cable 91, is connected at its ends to said cable 28, on each side of the drum 48, and is trained through apertures in the spring switch members 88, adapting the cable to slide therethrough. Stops 92, are secured to said auxiliary cable 91, at points between said spring switches 88, and the end connections of said auxiliary cable and said cable 28, so that when the adjusting mechanism, in this case the elevator 30, has been moved into an extreme position, one of said stops 92, will have been drawn inwardly against said spring switch to thereby open the same and break the electric circuit, thereby disconnecting the clutch mechanism operating the elevator surface of the aeroplane. A similar construction is used in connection with said controlling cable 27, the auxiliary cord in this case being trained through the apertured spring switches 77.

In the modification illustrated in Fig. 22, the pear shaped movable element 13, is replaced with a pendulum 13ª, suspended from a central electrical terminal 12ª, and adapted to close any one of the wall contacts 10, 10ª, 11, and 11ª, as already described with reference to Fig. 4, type of biplane, although this particular type of aeroplane has only been used to illustrate the adaptation of my invention thereto.

The operation is as follows: If the operator desires to fly in a straight horizontal path, the stabilizing bowl is set with the respective indicators 23, and 24, at a central position denoted as zero. Should for any reason the machine be diverted slightly from its course, either tilted upwardly or downwardly longitudinally, or laterally by a sudden gust of wind or other atmospheric conditions, the stabilizing bowl 2, being moved from its level position, the ball therein will close one of the contacts and the proper magnetic clutch member being energized thereby, either one of the drums 47, or 48, as the case may be, will be rotated, thus actuating the controlling surfaces of the aeroplane, until the aeroplane has been restored to normal, and of course at such a time the stabilizing bowl again being in level position the electrical contact will be broken and the respective drum for the time being will cease to rotate. The forward and aft contacts in said bowl are denoted respectively by the reference numerals 10, and 10ª. The automatic operating mechanism for the left wing of the aeroplane which governs the lateral stability thereof, is governed by the contact 11, and the right wing by the contact 11ª, in said stabilizing bowl.

The stabilizing mechanism also serves to properly bank the machine when the operator makes a turn, and this in particular is a feature wherein the device acts with mathematical accuracy serving to insure a banking of the machine at the proper angle, which is sometimes often miscalculated by an operator when manually controlling the machine.

Assuming the machine to be flying in a straight horizontal path and perfectly level, the operator using only the lateral guiding lever 31, (which controls the vertical rudders of the machine) throws the same in position for a quick turn to the left. This creates a centrifugal force, which, acting upon the vibratory element 13, in the stabilizing bowl, serves to move the same against the right lateral contact 11ª, which serves to close the electric circuit to cause proper rotation of the drum 47, whereupon the lateral control cables 27, being actuated thereby, will cause an upward tilting of the right wing of the aeroplane, thus causing the machine to bank at the proper angle. The contacts, of course, will remain closed until the machine has reached the proper banking angle, whereupon the forces of gravity and centrifugal force, both acting upon the vibratory element 13, within said bowl, will produce a resultant force acting at normal and through the central contact and the vibratory element 13, so that although the stabilizing bowl is in an inclined position, the vibratory element 13, will be disposed centrally therein and out of contact with all of the contact members in the side of said bowl. However, when the turn has been made and the machine straightened out upon its course, the centrifugal force will vanish and that of gravity acting upon the vibratory element 13, will serve to draw the same downwardly into contact with said contact member 11, which, operating the proper clutch member, will cause an upward tilting of the left wing of the aeroplane and a lowering of the right wing thereof until the machine is in level position once more. Thus it is seen that the operator, by merely using the guiding lever 31, may traverse a zigzag course through the air, and the stabilizing mechanism will serve to bank the machine at the proper angle even though the curves or turns made by the machine be alternately first in one direction and then in another. Should for any reason the machine while traveling through the air strike a downwardly flowing current of air, thus causing a depression of the head of the machine, the forward contact 10, will be closed, thus setting in operation the proper mechanism to elevate the surface 30, and thereby incline the machine upwardly again to normal. However, if the operator desires to make a spiral ascent or descent the stabilizing bowl may be adjusted to such position about its respective longitudinal and transverse axes as to insure the machine maintaining such a predetermined course of flight.

Should an emergency arise, or occasion demand, when the machine is flying under the control of the stabilizing mechanism the operator may seize the manually operatable levers 32 and 33, and by such act raising the bridge contact members 42, and 43, respectively, thereby break the electrical circuit, and permit manual operation of the machine without any counteracting effect by the stabilizing mechanism.

A positive or negative acceleration of the machine will not cause a serious depression or elevation thereof for the following reason. Assuming the machine to be suddenly checked in its flight relative the earth by meeting with a head wind, the vibratory element 13, due to its inertia, will be thrown forward, thus closing the forward contact in the bowl and tending to elevate the machine. However, the impact is only momentary and the energy being immediately dissipated the vibratory element 13, falls back into a neutral position, the lag or inertia of the clutches preventing immediate response to the momentary closing of the contacts and hence precluding accident to the machine through a misapplication of the controls by the stabilizing mechanism.

I am aware that various details of construction may be varied through a wide range without departing from the principles of this invention. I therefore do not purpose limiting the patent granted otherwise than necessitated by the prior art.

I claim as my invention:

1. A stabilizing device for vehicles comprising a container, a plurality of longitudinal and transverse electrical contact members therein, an unstable single solid vibratory element freely supported on and within said container and adapted to connect all of said electrical contacts with a source of E. M. F. guiding means for said vehicle, and operative connections set in operation by the closure of said electrical contacts to drive said guiding means.

2. In combination with a vehicle, a stabilizing element comprising a container, a gimbal mounting therefor permitting universal movement thereof, a plurality of transverse and longitudinal electrical contacts in said container, a central contact therein, an unstable element resting on said central contact and adapted to connect the same both with said transverse and longitudinal contacts, guiding mechanism for an aeroplane, and operative connections set in operation by said stabilizing element to actuate said guiding mechanism of the aeroplane.

3. In a device of the class described the combination with an aeroplane of a universally adjustable stabilizing device, an unbalanced oscillatable element therein, mechanism associated therewith to operate the controlling means of said aeroplane to restore the same to a predetermined path of flight when diverted therefrom, means adjusting said stabilizing device at various angles, and indicating means thereon to indicate the adjustment thereof.

4. In a device of the class described the combination with an aeroplane, of a stabilizing device mounted thereon, transverse and longitudinal pivoted supports supporting said stabilizing device, a plurality of transverse and longitudinal electrical contacts therein, an unstable pointed element supported therein adapted to normally remain against one of said electrical contacts to close a circuit, and mechanism connected to said stabilizing device and to the controlling means of said aeroplane to properly operate the latter when the aeroplane is diverted from a predetermined path of flight.

5. In a device of the class described for vehicles, a stabilizing element, electrical contacts therein, a freely movable unstable element within said stabilizing device adapted to normally remain against one of said contacts to normally close a circuit, magnetic clutches adapted to be set in operation by the closure of said contacts, drums connected thereto adapted to be driven by said clutches, controlling cables of a vehicle wound about said drums adapted to be actuated thereby, means adapted to break the electrical connection when the extreme movement of said controlling means has been reached, and auxiliary cables connected to said controlling cables to actuate said means.

6. In combination with a vehicle a stabilizing element comprising a container, electrical contacts therein, an unbalanced element resting on one of said contacts adapted to remain normally against another of said electrical contacts to close a circuit, a plurality of magnetic clutches adapted to be set in operation thereby, guiding mechanisms for a vehicle connected thereto, and means connected to said guiding means acting automatically to break the electrical connection when the extreme limit of movement thereof has been reached.

7. In a device of the class described a container, a gimbal mounting therefor permitting universal adjustment thereof, a plurality of electrical contacts disposed laterally in said container, a central contact, an unstable element supported on said central contact adapted to oscillate from one lateral contact to another when said container is moved, controlling means for a vehicle, and mechanism set in operation by the closure of said electrical contacts to operate said controlling means of the vehicle.

8. In a device of the class described the combination with an aeroplane, of a stabilizing element comprising a universally adjustable container, a plurality of laterally disposed transverse and longitudinal electrical contacts therein, a central contact in the lower portion thereof, an unstable element supported on said central contact and normally resting against one of said lateral contacts when said container is in level position, said contacts so disposed about said unstable element to permit a vibratory movement thereof to contact with one or the other of said contacts continuously, controlling means for a vehicle, and mechanism set in operation by the closure of said electrical contacts to operate said controlling means of the vehicle to properly guide the same according to the adjustment of said container.

9. In a device of the class described an insulating universally adjustable container, electrical contacts disposed transversely and longitudinally on the interior side walls thereof, a central contact in the bottom of said container, and a solid pointed unstable oscillatable element resting on the contact in the bottom of said container and adapted to fall against the contacts in the side walls of the container to effect electrical communication between the same and said bottom contact.

10. A stabilizing device of the class described comprising a hollow insulating universally adjustable container, means adjusting the same, indicating devices to indicate the resultant adjustment thereof in transverse and longitudinal planes, a plurality of electrical contacts in the side walls of said container, a central contact in the bottom thereof, and an unstable solid element resting on said central contact adapted to effect electrical communication between said central contact and said contacts in the side walls of the container.

In testimony whereof I have hereunto subscribed my name in the presence of two subscribing witnesses:

ALFRED J. MACY.

Witnesses:
CHARLES W. HILLS, Jr.,
EDWARD HUSBAND.